United States Patent [19] [11] Patent Number: 5,008,574
Kitahata [45] Date of Patent: Apr. 16, 1991

[54] DIRECT CURRENT MOTOR ASSEMBLY WITH RECTIFIER MODULE

[75] Inventor: Roy S. Kitahata, Fullerton, Calif.

[73] Assignee: The Chamberlain Group, Elmhurst, Ill.

[21] Appl. No.: 504,640

[22] Filed: Apr. 4, 1990

[51] Int. Cl.[5] ............ H02K 5/10; H02K 11/00; H01R 13/59
[52] U.S. Cl. ............ 310/68 D; 310/71; 310/89; 439/620
[58] Field of Search ............ 15/49 R, 50 R, 98; 310/42, 43, 31, 68 D, 72; 439/620

[56] References Cited

U.S. PATENT DOCUMENTS

| 3,078,409 | 2/1963 | Bertsche, Jr. et al. | 321/8 |
| 3,196,317 | 7/1965 | Potter et al. | 317/100 |
| 3,502,915 | 3/1970 | Moret et al. | 310/71 |
| 3,527,971 | 9/1970 | Means | 310/68 |
| 3,924,147 | 12/1975 | Tarnow et al. | 310/68 |
| 4,267,536 | 5/1981 | Hollyday | 439/620 |
| 4,442,366 | 4/1984 | Cuneo | 310/71 |
| 4,554,473 | 11/1985 | Muller | 310/67 R |
| 4,590,635 | 5/1986 | Tucker et al. | 15/98 |
| 4,710,657 | 12/1987 | Ocken et al. | 310/62 |
| 4,727,274 | 2/1988 | Adam et al. | 310/71 |
| 4,769,572 | 9/1988 | Voigt | 310/68 D |
| 4,791,329 | 12/1988 | Ubukata et al. | 310/89 |
| 4,791,694 | 12/1964 | Itaya et al. | 15/97 R |

FOREIGN PATENT DOCUMENTS 1149793  6/1963  Fed. Rep. of Germany ........ 310/71

Primary Examiner—Steven L. Stephan
Assistant Examiner—D. L. Rebsch
Attorney, Agent, or Firm—Fitch, Even, Tabin & Flannery

[57] ABSTRACT

A direct current motor assembly for connection to an alternating current power supply to drive an appliance. The assembly includes a tubular housing with an armature having windings positioned inside the housing. End closures are provided for both ends of the housing, with one of the closures having an aperture in which the body portion of a rectifier assembly is mounted. The rectifier assembly includes a pair of input terminals extending outside of the housing and a pair of output terminals positioned inside the housing so that direct current may be provided to the armature without any discrete electrical conductors extending through either the end closures or the housing.

8 Claims, 2 Drawing Sheets

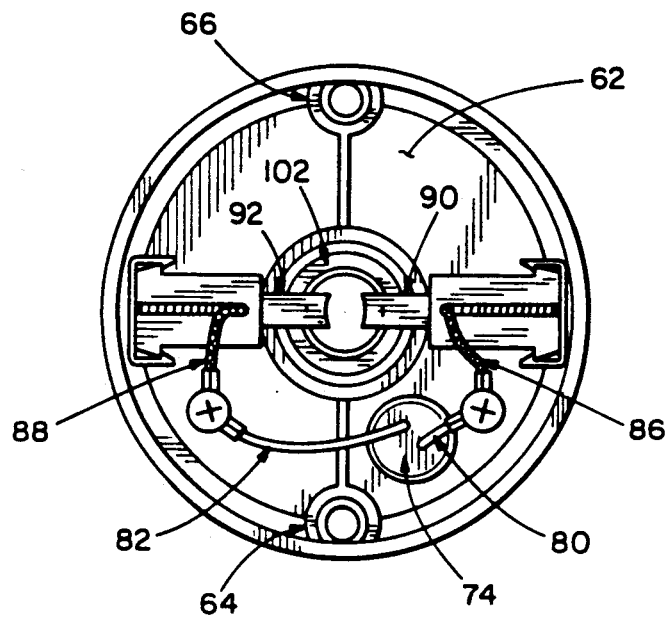
FIG. 5
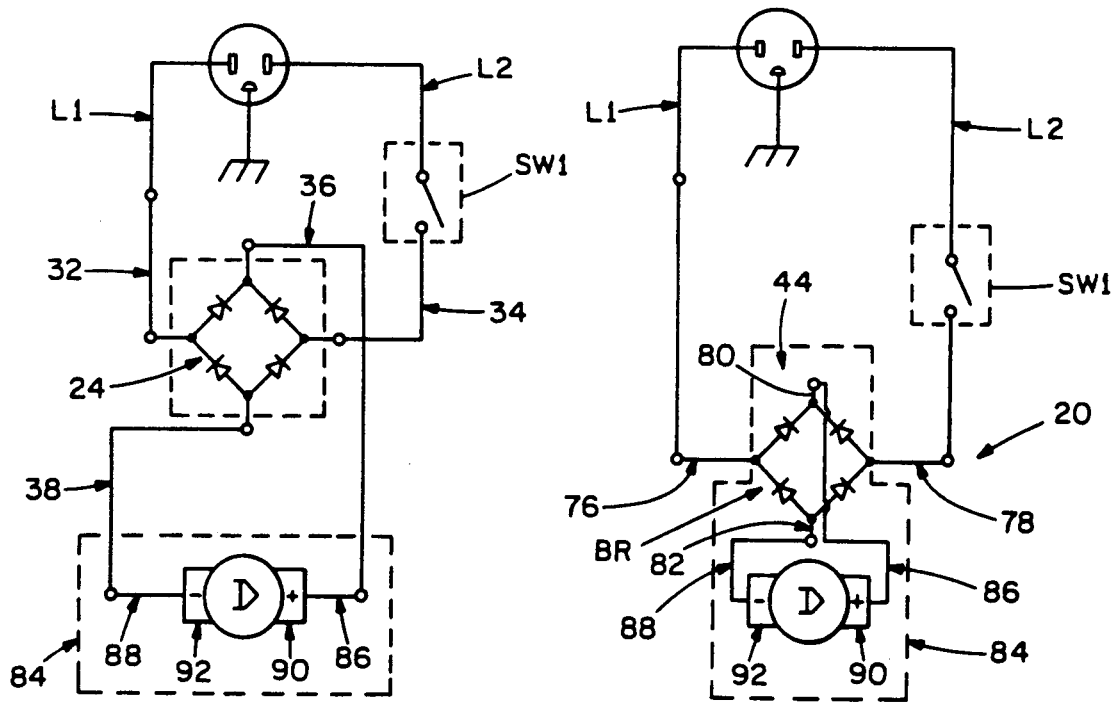
PRIOR ART
FIG. 6
FIG. 7

DIRECT CURRENT MOTOR ASSEMBLY WITH RECTIFIER MODULE

This invention relates to electrical motor assemblies and, more particularly, to a direct current (dc) motor assembly including an end closure holding a rectifier assembly for converting alternating current (ac) to dc.

BACKGROUND OF THE INVENTION

Various electrical appliances for home or light industrial use, such as the orbital waxer/polisher shown in U.S. Pat. No. 4,791,694, the teachings of which are hereby incorporated by reference, incorporate dc motors. Such motors are relatively light and inexpensive to manufacture. However, the use of a dc motor requires the presence of a rectifier assembly for converting single phase ac to dc for application to the armature windings of the motor.

Heretofore, such rectifier assemblies were typically positioned either remote from the motor housing, or were supported by the outside of the housing. Such positioning of the rectifier assembly requires extensive wiring and discrete conductors passing through the motor housing. While such rectifier assembly location operated satisfactorily, it is always desirable to reduce the number of components and promote ease of manufacture of such dc motor assemblies.

U.S. Pat. No. 3,078,409 to Bertsche, Jr., et al., discloses an electrical power converter including an end frame formed of metal. The end frame is provided with threaded bores which receive rectifier plugs. The converter also includes a subframe which is electrically isolated from the end frame. As shown in the electrical schematic of FIG. 5, the end plate serves as the ground. A terminal bolt, extending through the end plate and insulated therefrom by a sleeve, is connected to the subframe and serves as the positive terminal of the bridge rectifier.

U.S. Pat. No. 3,527,971 to Means illustrates a dynamoelectric machine having a pair of metal mounting plates disposed inside of the motor housing and into which diodes are embedded.

U.S. Pat. No. 4,769,572 to Voigt discloses diodes forming a bridge rectifier mounted on the inside surface of the end shield of the motor. Similarly, U.S. Pat. No. 3,924,147 to Tarnow et al. teaches an insulating plate positioned inside of the motor housing and which supports diode rectifiers.

SUMMARY OF THE INVENTION

Among the several aspects and features of the present invention may be noted the provision of an improved dc motor assembly. This assembly reduces the number of components and avoids discrete conductors passing through the motor housing. Furthermore, there is no need for any strain relief assembly, as the body of the rectifier assembly is firmly held in an aperture in an end plate of the motor housing. The motor assembly of the present invention is reliable in use, has long service life, and is relatively easy and economical to manufacture. Other aspects and features of the present invention will be, in part, apparent and, in part, pointed out specifically in the following specification and accompanying drawings.

Briefly, the direct current motor assembly of the present invention includes a tubular housing in which is positioned an armature having windings. A first end closure closes one end of the housing and a second end closure is provided for closing the other end of the housing. The first end closure includes an end plate having an aperture and the first end closure further includes a rectifier assembly including a body portion including a first end and a second end. A pair of input terminals extend from the body portion first end and a pair of output terminals extend from the body portion second end. The body portion is retained in the aperture so that the input terminals are positioned outside the housing and the output terminals are positioned inside of the housing so that direct current may be provided to drive the armature without any discrete electrical conductors passing through either the end closures or the housing.

BRIEF DESCRIPTION OF THE DRAWINGS

FIG. 5 is a bottom elevational view of the end bell of FIG. 3;

FIG. 6 is an electrical schematic diagram of the prior art dc motor assembly of FIG. 1;

FIG. 7, similar to FIG. 6, is an electrical schematic diagram of the dc motor assembly of the present invention;

DESCRIPTION OF THE PREFERRED EMBODIMENT

Figure 1:
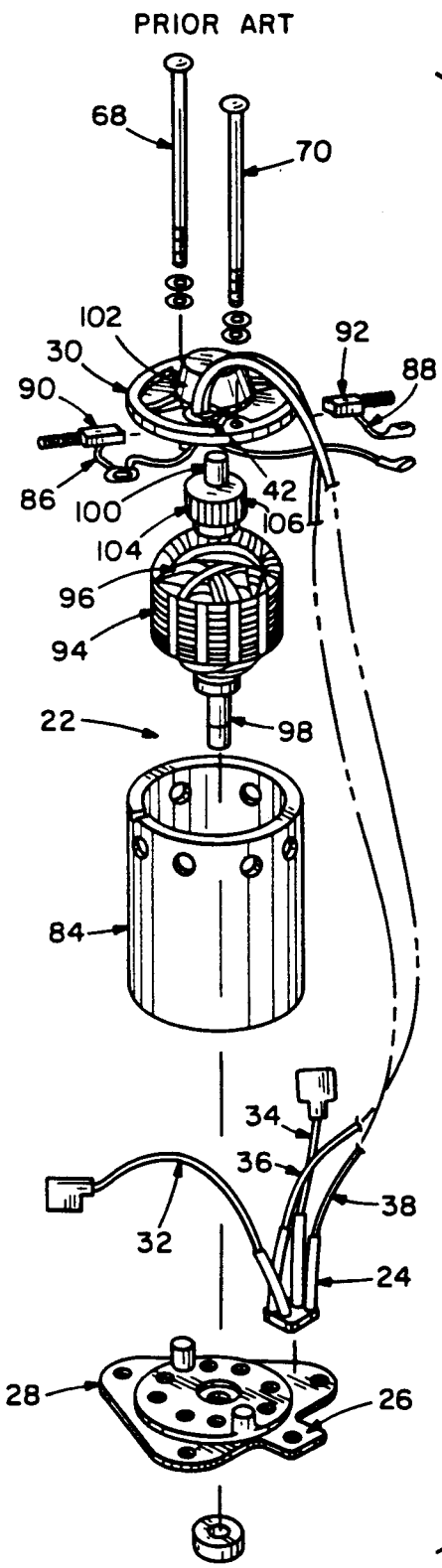
FIG. 1 is an exploded perspective view of a prior art dc electric motor assembly having a rectifier assembly positioned outside the housing.
Figure 2:
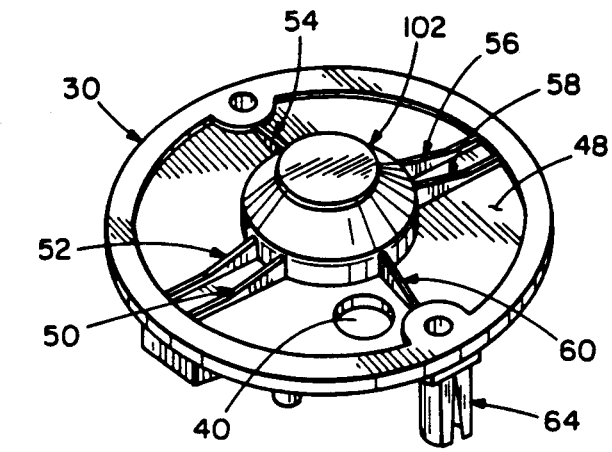
FIG. 2 is a perspective view of an end bell of an electric motor housing with an aperture for receiving a rectifier assembly.

Referring now to the drawings, a dc motor assembly embodying various components of the present invention is generally indicated by reference character 20 in FIG. 7. The motor assembly 20 uses a great plurality of the components of a prior art dc motor assembly 22 shown in FIG. 1. This prior art assembly includes a rectifier assembly 24 which is fastened to an extension 26 of the lower end closure 28 of the motor housing assembly which also includes an upper end closure or bell 30 which is formed of insulative material. The rectifier assembly includes input leads 32, 34 for connection to the flexible insulated leads L1, L2 connected to a nominal 120V ac power supply. Rectifier assembly 24 also includes a pair of output leads 36, 38 which extend through a circular aperture 40 in the end bell 30. A strain relief clamp 42 is employed to hold the leads as they extend through the aperture. A single pole, single throw switch SW1 is provided to control energization of the motor.

Figure 3:
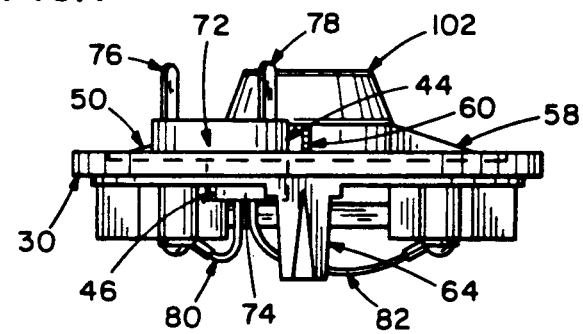
FIG. 3 is a side elevational view of the end bell of the present invention holding the rectifier assembly.
Figure 4:
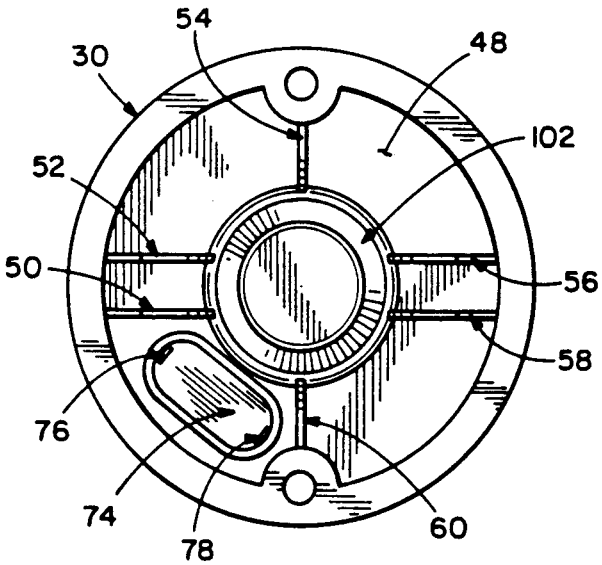
FIG. 4 is a plan view of the end bell of FIG. 3.

In the present invention, as best shown in FIGS. 3-5, a rectifier assembly 44 includes a body portion 46 which is held by an adhesive in the aperture 40 of the end bell 30. End bell 30 comprises an outer surface 48 with reinforcing ribs 50, 52, 54, 56, 58, 60 and an inner surface 62 with posts 64, 66 having holes to receive bolts 68, 70 which hold the end closures to the housing. Body portion 46 includes a first end 72 and a second end 74. First end 72 is oval and is larger than second end 74, which is circular. The circular aperture 40 is sized to pass circular second end 74 but not oval first end 72. The oval first end 72 engages outer surface 48 of end bell 30, while the circular second end 74 extends past the inner surface 62 of the end bell 30. Thus, when the adhesive is applied about the rectifier body second end 74, the second end can be inserted into aperture 40 until the larger body first end 72 engages the outer surface 48 of the end bell 30. A pair of input terminals 76, 78 extend from body portion first end 72, and a pair of output terminals 80, 82 extend from body portion second end 74. The body portion 46 defines a well for receiving the electronic components (4 diodes) which form the full wave bridge rectifier BR shown in FIG. 7. Such a bridge rectifier is commercially available. The well is filled with a potting compound to encapsulate the electronic components with the various leads extending from the body portion.

The body portion 46 of rectifier assembly 44 is retained in aperture 40 with the input terminals 76, 78 disposed outside the tubular motor housing 84 and the output terminals 80, 82 disposed inside the tubular motor housing 84. Being positioned inside the housing 84, the output terminals 80, 82 can be connected directly to terminals 86, 88 of motor brushes 90, 92, thereby dispensing with discrete electrical conductors to connect the rectifier outputs to the leads of the motor brushes, such as output leads 36, 38 that pass through end bell 30 to connect rectifier 24 to motor brush terminals 86, 88 in the prior art configuration. Having dispensed with discrete electrical conductors which pass through the end bell, the present invention also dispenses with the need for a strain relief clamp, such as strain relief clamp 42.

The motor housing 84 accommodates the armature 94, which includes windings 96, a drive shaft 98 and a stabilizer shaft 100. Drive shaft 98 extends through lower end closure 28 where it may be connected to the tool to be driven. Stabilizer shaft 100 fits into a roller bearing assembly held in the central extension 102 of the end bell 30. The stabilizer shaft 100 carries a commutator 104 with spaced segments 106 connected to armature windings 96. Motor brushes 90, 92 ride on commutator 104. As such dc motor components are well known by those of skill in the art, they need not be discussed further here.

The advantages of placing the rectifier assembly 44 of the present invention in the end bell 30 are illustrated by comparing the schematic diagram of the prior art motor assembly, FIG. 6, with that of the motor assembly of the present invention, FIG. 7. With the present invention, the input leads 36 and 38 are eliminated. Additionally, the need to mount the rectifier 24 on the lower end closure is obviated, and there is no need for the strain relief clamp 42 (FIG. 1) because no discrete connectors pass through the end bell 30. Accordingly, the motor assembly of the present invention is easier to assemble and less expensive than the prior art motor assembly, and also requires fewer components. Another advantage of mounting the rectifier assembly in the end bell is that some of the heat occasioned by the operation of the diodes of the bridge rectifier is directly transferred outside of the housing.

In view of the above, it will be seen that the several objects of the invention are achieved and other advantageous results are obtained.

As various changes could be made in the above constructions without departing from the scope of the invention, it is intended that all matter contained in the above description or shown in the accompanying drawings shall be interpreted as illustrative and not in a limiting sense.

What is claimed is:

1. A direct current motor assembly for connection to an alternating current power supply and adapted to drive an appliance, said assembly comprising:
    a tubular housing;
    an armature having windings and disposed inside said housing;
    a first end closure closing one end of said housing; and
    a second end closure closing the other end of said housing, said first end closure comprising an end plate having an aperture, said first end closure further comprising a rectifier assembly including a body portion with a first end and a second end, a pair of input terminals extending from said body portion first end, and a pair of output terminals extending from said body portion second end, said body portion being retained in said aperture with said input terminals being disposed in their entirety outside of said housing and said output terminals positioned in their entirety inside said housing whereby direct current may be provided to said armature without any discrete electrical conductors extending through said end closure or said housing.

2. An assembly as set forth in claim 1 wherein said rectifier body portion is retained in said aperture by means of glue.

3. An assembly as set forth in claim 1 wherein said armature includes a drive shaft extending through said second end closure, said first end closure including an end bell having a central extension, said armature further including a stabilizer shaft extending opposite said drive shaft, said central extension holding roller means receiving said stabilizer shaft.

4. An assembly as set forth in claim 3 wherein said stabilizer shaft carries a commutator having spaced segments connected to said armature windings, said end bell being formed of insulative material, said first end closure further comprising a pair of spaced brushes supported by said end bell and riding on said commutator, said output terminals being connected to corresponding brushes.

5. An assembly as set forth in claim 1 wherein said rectifier body portion includes a smaller component and a larger component, said aperture being sized to pass said smaller component but not pass said larger component.

6. An assembly as set forth in claim 5 wherein said end plate includes an end bell having an inside surface and an outside surface, said aperture being through said end bell, said larger component engaging said outside surface and said smaller component extending past said inside surface.

7. An assembly as set forth in claim 6 wherein said aperture and said smaller component are circular and wherein said larger component is oval.

8. A direct current motor assembly for connection to an alternating current power supply and adapted to drive an appliance, said assembly comprising:
    a tubular housing;
    an armature having windings and disposed inside said housing;
    a first end closure assembly closing one end of said housing; and
    a second end closure closing the other end of said housing, said housing, said first end closure assembly comprising an end plate having an aperture, said first end closure further comprising a rectifier assembly including a body portion with a first end and a second end, a pair of input terminals extending from said body portion first end, and a pair of output terminals extending from said body portion second end, said body portion being retained in said aperture with said input terminals being disposed in their entirety outside of said housing and said output terminals positioned in their entirety inside said housing, said rectifier body portion being retained in said aperture by means of an adhesive, said rectifier body portion including a smaller component and a larger component, said aperture being sized to pass said smaller component but not pass said larger component.

* * * * *

UNITED STATES PATENT AND TRADEMARK OFFICE
CERTIFICATE OF CORRECTION

PATENT NO. : 5,008,574

DATED : April 16, 1991

INVENTOR(S) : Kitahata, Roy S.

It is certified that error appears in the above-identified patent and that said Letters Patent is hereby corrected as shown below:

ON THE TITLE PAGE:
In the Abstract, line 2, after "supply", insert --and adapted--.

Column 1, line 32, delete the space between "plugs" and the period.

Column 2, line 30, after "FIG. 1;" insert --and--.

Column 2, line 33, change ";" [semicolon] to --.-- [a period].

Column 4, line 66, delete "said housing".

Signed and Sealed this

Ninth Day of February, 1993

Attest:

STEPHEN G. KUNIN

*Attesting Officer*  Acting Commissioner of Patents and Trademarks